US012679961B2

(12) United States Patent
Kahlen et al.

(10) Patent No.: US 12,679,961 B2
(45) **Date of Patent: *Jul. 14, 2026**

(54) FILLED AUTOMOTIVE POLYPROPYLENE COMPOSITION CONTAINING RECYCLATES

(71) Applicant: Borealis AG, Vienna (AT)

(72) Inventors: Susanne Kahlen, Linz (AT); Angelica Legras, Linz (AT); Hermann Braun, Linz (AT); Michael Jerabek, Linz (AT); Christophe Salles, Courbevoie (FR)

(73) Assignee: Borealis AG, Vienna (AT)

( * ) Notice: Subject to any disclaimer, the term of this patent is extended or adjusted under 35 U.S.C. 154(b) by 749 days.

This patent is subject to a terminal disclaimer.

(21) Appl. No.: 18/018,297

(22) PCT Filed: Aug. 11, 2021

(86) PCT No.: PCT/EP2021/072356
§ 371 (c)(1),
(2) Date: Jan. 27, 2023

(87) PCT Pub. No.: WO2022/034127
PCT Pub. Date: Feb. 17, 2022

(65) Prior Publication Data
US 2023/0287202 A1     Sep. 14, 2023

(30) Foreign Application Priority Data

Aug. 13, 2020   (EP) .................................... 20190838

(51) Int. Cl.
*C08L 23/12*      (2006.01)
*C08F 210/06*     (2006.01)

(52) U.S. Cl.
CPC ............ *C08L 23/12* (2013.01); *C08F 210/06* (2013.01); *C08L 2205/025* (2013.01); *C08L 2205/035* (2013.01); *C08L 2207/02* (2013.01); *C08L 2207/20* (2013.01); *C08L 2666/72* (2013.01)

(58) Field of Classification Search
CPC .............. C08L 23/12; C08L 2205/025; C08L 2205/035; C08L 2207/02; C08L 2666/72; C08F 210/06
See application file for complete search history.

(56) References Cited

U.S. PATENT DOCUMENTS

| | | | | |
|---|---|---|---|---|
| 9,181,423 | B2 * | 11/2015 | Kock | .................... C08L 23/06 |
| 2012/0108728 | A1 | 5/2012 | Tranninger | |
| 2015/0166776 | A1 | 6/2015 | Kock et al. | |
| 2018/0319967 | A1 | 11/2018 | Lummerstorfer et al. | |

FOREIGN PATENT DOCUMENTS

| | | |
|---|---|---|
| CN | 103443194 A | 12/2013 |
| CN | 108137889 A | 6/2018 |
| EP | 491566 A2 | 6/1992 |
| EP | 586390 A1 | 3/1994 |
| EP | 591224 A1 | 4/1994 |
| EP | 2495280 A1 | 9/2012 |
| WO | 9219658 A1 | 11/1999 |
| WO | 2018206353 A1 | 11/2018 |
| WO | 2020152314 A1 | 7/2020 |
| WO | 2020152315 A1 | 7/2020 |

OTHER PUBLICATIONS

International Search Report and Written Opinion for PCT/EP2021/072356 mailed Dec. 9, 2021, 11 pages.
European Search Report for EP20190838.1 dated May 18, 2021, 7 pages.
Brandrup et al., "Polymer Handbook", 4th edition, Chapter 3, John Wiley Sons, Inc. 1989, 23 pages.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Cheng, H.N., "C NMR Analysis of Ethylene-Propylene Rubbers," Macromolecules, 1984, vol. 17, 1984, pp. 1950-1955.
Singh, et al., "Triad Sequence Determination of Ethylene-Propylene Copolymers—Application of Quantitative 13C NMR," Polymer Testing, 2009, vol. 29, pp. 475-479.
Wang, et al., "Structural Analysis of Ethylene/Propylene Copolymers Synthesized with a Constrained Geometry Catalyst," Macromolecules, 2000, vol. 33, pp. 1157-1162.
Zhou, et al., "A new decoupling method for accurate quantification of polyethylene copolymer composition and triad sequence distribution with 13C NMR," Journal of Magnetic Resonance, vol. 187, 2007, pp. 225-233.
Office Action for Chinese Patent Application No. 202180059266.1 with English translation dated Apr. 2, 2024, 9 pages.

* cited by examiner

*Primary Examiner* — Heidi R Kelley
*Assistant Examiner* — Surbhi M Du
(74) *Attorney, Agent, or Firm* — Lowenstein Sandler LLP

(57) ABSTRACT

Composition suitable for automotive application obtainable by blending at least components a) to f) a) 5.0 to 45 wt.-%, preferably 9.0 to 42 wt. %, more preferably 10 to 40 wt.-% of a first heterophasic polypropylene copolymer (HECO 1) b) 2.0 to 20 wt.-%, preferably 2.5 to 18 wt.-%, more preferably 3.0 to 17 wt.-% of a second heterophasic polypropylene copolymer (HECO 2) c) 10 to 60 wt.-%, preferably 12 to 55 wt.-%, more preferably 14 to 52 wt.-% of a polypropylene-polyethylene blend (A) d) 2.5 to 25 wt.-%, preferably 5.0 to 22 wt.-% and more preferably 6.5 to 20 wt.-% of an ethylene based elastomer e) 5.0 to 30 wt.-%, preferably 7.0 to 25 wt.-% and more preferably 8.5 to 20 wt.-% of an inorganic filler f) 0.1 to 4.0 wt.-% of additives.

19 Claims, No Drawings

FILLED AUTOMOTIVE POLYPROPYLENE COMPOSITION CONTAINING RECYCLATES

CROSS-REFERENCE TO RELATED APPLICATION(S)

The present application is a national stage entry under 35 U.S.C. § 371 of International Application No. PCT/EP2021/072356, filed on Aug. 11, 2021, which claims priority to European Patent Application No. 20190838.1, filed on Aug. 13, 2020. The contents of these applications are hereby incorporated by reference in their entirety.

FIELD OF INVENTION

The present invention relates to polypropylene based composition suitable for the automotive industry containing inorganic fillers and recyclates.

BACKGROUND

Compositions suitable for the automotive industry typically contain one or more heterophasic polypropylene copolymer(s), and/or random heterophasic copolymers, plastomers as impact modifiers and conventionally some inorganic filler.

One of the fundamental problems in polymer business is recycling. At the moment the market for recyclates, particularly recyclates from household trash, commonly denoted PCR ('post-consumer resins') is somewhat limited. Starting from household trash, the sorting and separation processes employed will not allow preparing pure polymers, i.e. there will always be some contaminants, or the processes may even result in blends of different polymers. When it comes to polyolefins, which constitute the vast majority of the polymer fraction of the collected household trash, a perfect separation of polypropylene and polyethylene is hardly possible. Recycled polyolefin materials, particularly post-consumer resins, are conventionally cross-contaminated with non-polyolefin materials such as polyethylene terephthalate, polyamide, polystyrene or non-polymeric substances like wood, paper, glass or aluminum. Even worse, those post-consumer recycled polyolefin materials are readily available on a multi-ton scale but unfortunately have limited mechanical properties and frequently severe odor and/or emission problems. Apart from the required mechanical properties, the automotive industry is also very critical as far as odor and emissions are concerned, and there is a tendency to increase the requirements even further. This drastically limits the use of recyclates in automotive applications.

However, there is a deeply felt need for allowing the dumping and reuse of post-consumer polyolefin recyclates in final products without health and safety hazards.

The present invention is based on the surprising finding that sophisticated heterophasic polypropylene copolymers may be at least in part replaced by polypropylene-polyethylene blends as originating from post-consumer recycled polyolefin streams even with benefits as to impact and VOC properties.

SUMMARY OF THE INVENTION

The present invention insofar provides compositions suitable for automotive application
obtainable by blending components a) to f)

a) 5.0 to 45 wt.-%, preferably 9.0 to 42 wt. %, more preferably 10 to 40 wt.-% of a first heterophasic polypropylene copolymer (HECO 1)
b) 2.0 to 20 wt.-%, preferably 2.5 to 18 wt.-%, more preferably 3.0 to 17 wt.-% of a second heterophasic polypropylene copolymer (HECO 2)
c) 10 to 60 wt.-%, preferably 12 to 55 wt.-%, more preferably 14 to 52 wt.-% of a polypropylene-polyethylene blend (A)
d) 2.5 to 25 wt.-%, preferably 5.0 to 22 wt.-% and more preferably 6.5 to 20 wt.-% of an ethylene based elastomer
e) 5.0 to 30 wt.-%, preferably 7.0 to 25 wt.-% and more preferably 8.5 to 20 wt.-% of an inorganic filler
f) 0.1 to 4.0 wt.-% of additives
whereby all percentages refer to the total composition, and whereby
(i) the first heterophasic polypropylene copolymer (HECO 1) comprises a matrix phase and an elastomer phase dispersed therein, the first heterophasic polypropylene copolymer (HECO 1) having
a melt flow rate MFR2 (230° C., ISO1133) of 75 to 200 g/10 min, preferably 80 to 150 g/10 min, more preferably 85 to 120 g/10 min; and
an intrinsic viscosity (measured in decalin according to DIN ISO 1628/1 at 135° C.) of 1.2 dl/g to 3.2 dl/g, preferably 1.4 to 3.1 dl/g, more preferably 1.5 to 3.0 dl/g of the xylene cold soluble (XCS) fraction; and
(ii) the second heterophasic polypropylene copolymer (HECO 2) comprises a matrix phase and an elastomer phase dispersed therein, the second heterophasic polypropylene copolymer (HECO 2) having
a melt flow rate MFR2 (230° C., ISO1133) of 2.5 to 10 g/10 min, preferably 3.0 to 8.5 g/10 min, more preferably 3.5 to 7.5 g/10 min; and
an intrinsic viscosity (measured in decalin according to DIN ISO 1628/1 at 135° C.) of 4.0 dl/g to 10 dl/g, preferably 5.0 to 9.0 dl/g, more preferably 5.5 to 8.5 dl/g of the xylene cold soluble fraction (XCS); and whereby
(iii) the polypropylene-polyethylene blend (A) comprises
A-1) polypropylene,
A-2) polyethylene,
wherein the weight ratio of polypropylene to polyethylene is from 19:1 to 7:3, and the polypropylene-polyethylene blend (A) having
a melt flow rate MFR2 (230° C., ISO1133) of 5.0 to 30 g/10 min, preferably 7.0 to 26 g/10 min, more preferably 9.0 to 23 g/10 min; and
a xylene cold soluble fraction (XCS) of 2.0 to 15 wt.-%, preferably of 2.5 to 13 wt. %, more preferably 3.0 to 11 wt.-% (ISO 16152, 1ed, 25° C.); and
optionally a residual ash content of below 3.0 wt.-%, preferably 0.5 to 2.7 wt.-% and more preferably 0.7 to 2.5 wt.-%, and
whereby the polypropylene-polyethylene blend (A) optionally has one or more of the following properties
(aa) a content of limonene as determined by using solid phase microextraction (HS-SPME-GC-MS) of from 0.1 ppm to 100 ppm, preferably from 0.1 ppm to 50 ppm, more preferably from 0.1 ppm to 20 ppm, most preferably from 0.1 ppm to 5 ppm;
(bb) a content of fatty acid(s) as determined by using solid phase microextraction (HS-SPME-GC-MS) of 0.1 to 100 ppm;

(cc) a content of polyamide(s) as determined by NMR of 0.05 to 1.5 wt.-%;

(dd) a content of polystyrene(s) as determined by NMR of 0.05 to 3.0 wt.-%;

and whereby the ethylene based elastomer is selected from the group of C2C4 elastomers, C2C6 elastomers and/or C2C8 elastomers, preferably the ethylene based elastomer is a C2C4 elastomer, and whereby the ethylene based elastomer has a melt flow rate MFR2 (190° C., ISO1133) of 0.05 to 5.0 g/10 min, preferably 0.1 to 4.5 g/10 min, and has a density of 850 to 885 kg/m$^3$, preferably 855 to 875 kg/m$^3$; and whereby (iv) the inorganic filler, preferably talc, has a median particle size $d_{50}$ before compounding of 0.3 to 3.0 micrometers, more preferably 0.5 to 2.5 micrometers;

preferably has a top-cut particle size $d_{95}$ before compounding of 1.0 to 8.0 micrometers, and whereby components a) to e) amount to at least 90 wt.-%, preferably at least 95 wt.-%, most preferably at least 96 wt.-% of said composition suitable for automotive application.

More specifically, the present invention provides a composition suitable for automotive application obtainable by blending at least components a) to f)

a) 5.0 to 45 wt.-%, preferably 9.0 to 42 wt. %, more preferably 10 to 40 wt.-% of a first heterophasic polypropylene copolymer (HECO 1), b) 2.0 to 20 wt.-%, preferably 2.5 to 18 wt.-%, more preferably 3.0 to 17 wt.-% of a second heterophasic polypropylene copolymer (HECO 2), c) 10 to 60 wt.-%, preferably 12 to 55 wt.-%, more preferably 14 to 52 wt.-% of a polypropylene-polyethylene blend (A), d) 2.5 to 25 wt.-%, preferably 5.0 to 22 wt.-% and more preferably 6.5 to 20 wt.-% of an ethylene based elastomer, e) 5.0 to 30 wt.-%, preferably 7.0 to 25 wt.-% and more preferably 8.5 to 20 wt.-% of an inorganic filler, f) 0.1 to 4.0 wt.-% of additives, whereby all percentages refer to the total composition, and whereby (i) the first heterophasic polypropylene copolymer (HECO 1) comprises a matrix phase and an elastomer phase dispersed therein, the first heterophasic polypropylene copolymer (HECO 1) having a melt flow rate MFR2 (230° C., ISO1133) of 75 to 200 g/10 min, preferably 80 to 150 g/10 min, more preferably 85 to 120 g/10 min;

a xylene cold soluble fraction (XCS) of 8.0 to 20.0 wt.-%, preferably of 10 to 19 wt. %, more preferably 12 to 18 wt.-% (ISO 16152, 1ed, 25° C.);

an intrinsic viscosity (measured in decalin according to DIN ISO 1628/1 at 135° C.) of 1.2 dl/g to 3.2 dl/g, preferably 1.4 to 3.1 dl/g, more preferably 1.5 to 3.0 dl/g of the xylene cold soluble fraction (XCS); and a melt flow rate MFR2 (230° C., ISO1133) of 100 to 500 g/10 min, preferably 110 to 400 g/10 min, more preferably 120 to 300 g/10 min of the xylene insoluble fraction (XCI) (ISO 16152, 1ed, 25° C.), a content of units derived from ethylene in the xylene cold soluble fraction (XCS) of 25.0 to 50.0 wt.-%, preferably of 28.0 to 45.0 wt. %, more preferably 30.0 to 42.0 wt.-%, a total content of units derived from ethylene of 2.0 to 13.0 wt.-%, preferably 2.8 to 10.0 wt.-% and more preferably 3.5 to 9.0 wt.-%, and whereby (ii) the second heterophasic polypropylene copolymer (HECO 2) comprises a matrix phase and an elastomer phase dispersed therein, the second heterophasic polypropylene copolymer (HECO 2) having a melt flow rate MFR2 (230° C., ISO1133) of 2.5 to 10 g/10 min, preferably 3.0 to 8.5 g/10 min, more preferably 3.5 to 7.5 g/10 min;

a xylene cold soluble fraction (XCS) of 20 to 50 wt.-%, preferably of 21 to 45 wt. %, more preferably 22 to 40 wt.-% (ISO 16152, 1ed, 25° C.);

an intrinsic viscosity (measured in decalin according to DIN ISO 1628/1 at 135° C.) of 4.0 dl/g to 10 dl/g, preferably 5.0 to 9.0 dl/g, more preferably 5.5 to 8.5 dl/g of the xylene cold soluble fraction (XCS); and a melt flow rate MFR2 (230° C., ISO1133) of 20 to 90 g/10 min, preferably 25 to 80 g/10 min, more preferably 30 to 70 g/10 min of the xylene insoluble fraction (XCI) (ISO 16152, 1ed, 25° C.), and a content of units derived from ethylene in the xylene cold soluble fraction (XCS) of 15.0 to 25.0 wt.-%, preferably of 17.0 to 24.0 wt. %, more preferably 19.0 to 23.5 wt.-%, a total content of units derived from ethylene of 3.0 to 15.0 wt.-%, preferably 3.5 to 13.0 wt.-% and more preferably 4.0 to 11.0 wt.-%, and whereby (iii) the polypropylene-polyethylene blend (A) comprises A-1) polypropylene, A-2) polyethylene, wherein the weight ratio of polypropylene to polyethylene is from 19:1 to 7:3, and the polypropylene-polyethylene blend (A) having a melt flow rate MFR2 (230° C., ISO1133) of 5.0 to 30 g/10 min, preferably 7.0 to 26 g/10 min, more preferably 9.0 to 23 g/10 min;

a xylene cold soluble fraction (XCS) of 2.0 to 15 wt.-%, preferably of 2.5 to 13 wt. %, more preferably 3.0 to 11 wt.-% (ISO 16152, 1ed, 25° C.); and optionally a residual ash content of below 3.0 wt.-%, preferably 0.5 to 2.7 wt.-% and more preferably 0.7 to 2.5 wt.-%, and whereby the polypropylene-polyethylene blend (A) has one or more of the following properties (aa) a content of limonene as determined by using solid phase microextraction (HS-SPME-GC-MS) of from 0.1 ppm to 100 ppm, preferably from 0.1 ppm to 50 ppm, more preferably from 0.1 ppm to 20 ppm, most preferably from 0.1 ppm to 5 ppm;

(bb) a content of fatty acid(s) as determined by using solid phase microextraction (HS-SPME-GC-MS) of 0.1 to 100 ppm;

(cc) a content of polyamide(s) as determined by NMR of 0.05 to 1.5 wt.-%;

(dd) a content of polystyrene(s) as determined by NMR of 0.05 to 3.0 wt.-%;

and whereby the ethylene based elastomer is selected from the group of C2C4 elastomers, C2C6 elastomers and/or C2C8 elastomers, preferably the ethylene based elastomer is a C2C4 elastomer, the ethylene based elastomer having a melt flow rate MFR2 (190° C., ISO1133) of 0.05 to 5.0 g/10 min, preferably 0.1 to 4.5 g/10 min, and having a density of 850 to 885 kg/m$^3$, preferably 855 to 875 kg/m$^3$; and whereby (iv) the inorganic filler, preferably talc has a median particle size d$_{50}$ before compounding of 0.3 to 3.0 micrometers, more preferably of 0.5 to 2.5 micrometers;

preferably has a top-cut particle size d$_{95}$ before compounding of 1.0 to 8.0 micrometers, and whereby components a) to e) amount to at least 90 wt.-%, preferably at least 95 wt.-%, most preferably at least 96 wt.-% of said composition suitable for automotive application.

The present invention further provides an article comprising, preferably consisting of the composition according to the present invention.

Advantages

The present invention not only allows the replacement of sophisticated heterophasic propylene copolymers by recycled polypropylene-polyethylene blends originating from household trash being available in very large scale but also enables the amount of filler, usually talc, to be increased. In other words, the surprising finding of significantly increased impact properties due to the incorporation of a recycled polypropylene-polyethylene blend allows a shift towards higher content of filler for a certain stiffness. Thus, there is a multi-dimensional advantage: the incorporation of a recycled polypropylene-polyethylene blend not only allows the lowering of the amount of virgin heterophasic propylene copolymers but further the total amount of polymers in the composition.

Definitions

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below. Unless clearly indicated otherwise, use of the terms "a," "an," and the like refers to one or more. For the purposes of the present description, the term "recycled waste" or "recycled material" is used to indicate a material recovered from both post-consumer waste and industrial waste, as opposed to virgin polymers. Post-consumer waste refers to objects having completed at least a first use cycle (or life cycle), i.e. having already served their first purpose. In contrast to that, industrial waste refers to manufacturing scrap, respectively conversion scrap, which does not normally reach a consumer. The term "virgin" denotes the newly produced materials and/or objects prior to their first use, which have not already been recycled. Virgin materials and post-consumer materials can be differentiated easily based on absence or presence of contaminants such as limonene and/or fatty acids and/or paper and/or wood. Polypropylene-polyethylene blends can also be differentiated with respect to their origin by presence of polystyrene and/or polyamide. Residual content denotes a content above the detection limit. Many different kinds of polyethylene or polypropylene can be present in "recycled material". The ratio polypropylene (A-1) versus polyethylene plus polyethylene copolymer (A-2) is determined experimentally by using isotactic polypropylene (iPP) and high density polyethylene (HDPE) for calibration. A polymer blend is a mixture of two or more polymeric components. In general, the blend can be prepared by mixing the two or more polymeric components. A suitable mixing procedures known in the art is post-polymerization blending. Post-polymerization blending can be dry blending of polymeric components such as polymer powders and/or compounded polymer pellets or melt blending by melt mixing the polymeric components. A propylene random copolymer is a copolymer of propylene monomer units and comonomer units in which the comonomer units are distributed randomly over the polypropylene chain. A "compatibilizer" is a substance in polymer chemistry, which is added to a blend of polymers with limited miscibility in order to increase their stability. "Polypropylene-polyethylene blend" refers to a composition containing both polypropylene and polyethylene including also polypropylene copolymers as well as polyethylene copolymers. As a direct determination of the polypropylene content and polyethylene content is not possible, the weight ratio polypropylene (A-1) to polyethylene (A-2) of 19:1 to 7:3 denotes the equivalent ratio as determined from calibration by iPP and HDPE and determination by IR spectroscopy. The term "elastomer" denotes a natural or synthetic polymer having elastic properties. The term "XCS" refers to the xylene cold soluble content (XCS wt.-%) determined at 25° C. according to ISO 16152. The term "XCI" refers to the xylene cold insoluble content (XCI wt.-%) determined at 25° C. according to ISO 16152. If not indicated otherwise "%" refers to weight-%. The presence of a heterophasic nature can be easily determined by the number of glass transition points. Reactor blend is a blend originating from the production in two or more reactors coupled in series or in a reactor having two or more reaction compartments. A reactor blend may alternatively result from blending in solution. A reactor blend stands in contrast to a compound as produced by melt extrusion. Ethylene based elastomer means a elastomer being composed of units derived from ethylene in an amount of at least wt.-%.

Inventive Composition

The composition suitable for automotive application according to the present invention is particularly suitable for injection molding of articles to be used in the interior and exterior of vehicles.

The composition suitable for automotive application according to the present invention preferably has a melt flow rate (ISO 1133, 2.16 kg, 230° C.) of 10.0 to 25 g/10 min, more preferably has a melt flow rate (ISO 1133, 2.16 kg, 230° C.) of 12.0 to 25 g/10 min. The melt flow rate of the composition easily can be adjusted by varying the individual amount of the components and particularly may be adjusted by selecting a polypropylene-polyethylene blend (A) of adequate melt flow rate.

In a further aspect, the composition suitable for automotive application according to present invention preferably has a tensile modulus (ISO 527.2; 23° C.) of 1300 to 1700 MPa. The final tensile modulus can be fine-tuned by the amount of filler, whereby higher amounts of filler will result in higher tensile modulus.

The composition suitable for automotive application according to the present invention has one or more of the following characteristics:

(aa) residual amounts of limonene;

(bb) residual content of fatty acid(s);

(cc) residual content of polyamide(s);

(dd) residual content of polystyrene(s).

These residual amounts are introduced via the incorporation of the polypropylene-polyethylene blend (A), with the polypropylene-polyethylene blend (A) originating from consumer trash. The presence of such residual materials can be used as way of differentiating the incorporation of a polypropylene-polyethylene blend (A) originating from consumer trash versus the incorporation of polypropylene-polyethylene blend (A) originating from industrial trash. In other words, the above allows to differentiate into post-consumer recyclates (PCR) and post-industrial recyclates (PIR).

The composition suitable for automotive application according to the present invention preferably has a VOC as measured on the material as obtained directly from the extrusion following the procedure as described in VDA278 of less than 75 µg per gram of composition. Without wishing to be bound by theory, the applicant believes that in a first aspect the presence of filler, particularly the presence of talc is beneficial. In a second aspect, the incorporation of poly-propylene-polyethylene blend (A) also reduced overall VOC content as the polymers may have lost some amounts of VOC over their first use because of being subjected to the elements, i.e. higher temperatures together with wind.

HECO 1

HECO 1 is a heterophasic polypropylene copolymer, i.e. comprises a matrix phase and an elastomer phase dispersed therein. The first heterophasic polypropylene copolymer (HECO 1) has a melt flow rate MFR2 (230° C., ISO1133) of 75 to 200 g/10 min, preferably 80 to 150 g/10 min, more preferably 85 to 120 g/10 min; and an intrinsic viscosity (measured in decalin according to DIN ISO 1628/1 at 135° C.) of 1.2 dl/g to 3.2 dl/g, preferably 1.4 to 3.1 dl/g, more preferably 1.5 to 3.0 dl/g of the xylene cold soluble fraction (XCS). HECO 1 particularly contributes to the good injection molding properties of the composition. Preferably, HECO 1 has a melt flow rate MFR2 (230° C., ISO1133) of 75 to 200 g/10 min, preferably 80 to 150 g/10 min, more preferably 85 to 120 g/10 min; and a xylene cold soluble fraction (XCS) of 8.0 to 20.0 wt.-%, preferably of 10 to 19 wt. %, more preferably 12 to 18 wt.-% (ISO 16152, 1ed, 25° C.); and an intrinsic viscosity (measured in decalin according to DIN ISO 1628/1 at 135° C.) of 1.2 dl/g to 3.2 dl/g, preferably 1.4 to 3.1 dl/g, more preferably 1.5 to 3.0 dl/g of the xylene cold soluble fraction (XCS); and a melt flow rate MFR2 (230° C., ISO1133) of 100 to 500 g/10 min, preferably 110 to 400 g/10 min, more preferably 120 to 300 g/10 min of the xylene insoluble (XCI) fraction (ISO 16152, 1ed, 25° C.), and a content of units derived from ethylene in the xylene cold soluble fraction (XCS) of 25.0 to 50.0 wt.-%, preferably of 28.0 to 45.0 wt. %, more preferably 30.0 to 42.0 wt.-%, and a total content of units derived from ethylene of 2.0 to 13.0 wt.-%, preferably 2.8 to 10.0 wt.-% and more preferably 3.5 to 9.0 wt.-%.

In a particularly preferred embodiment HECO 1 has a melt flow rate MFR2 (230° C., ISO1133) of 85 to 120 g/10 min; and a xylene cold soluble fraction (XCS) of 12 to 18 wt.-% (ISO 16152, 1ed, 25° C.); and an intrinsic viscosity (measured in decalin according to DIN ISO 1628/1 at 135° C.) of 1.5 to 3.0 dl/g of the xylene cold soluble fraction (XCS); and a melt flow rate MFR2 (230° C., ISO1133) of 120 to 300 g/10 min of the xylene insoluble (XCI) fraction (ISO 16152, 1ed, 25° C.), and a content of units derived from ethylene in the xylene cold soluble fraction (XCS) of 30.0 to 42.0 wt.-%, and a total content of units derived from ethylene of 3.5 to 9.0 wt.-%.

HECO2

HECO 2 is a heterophasic polypropylene copolymer, i.e. comprises a matrix phase and an elastomer phase dispersed therein, having a melt flow rate MFR2 (230° C., ISO1133) of 2.5 to 10 g/10 min, preferably 3.0 to 8.5 g/10 min, more preferably 3.5 to 7.5 g/10 min; and an intrinsic viscosity (measured in decalin according to DIN ISO 1628/1 at 135° C.) of 4.0 dl/g to 10 dl/g, preferably 5.0 to 9.0 dl/g, more preferably 5.5 to 8.5 dl/g of the xylene cold soluble fraction (XCS). HECO 2 insofar substantially differs from HECO 2. HECO 2 particularly contributes to the good surface properties, especially to a low MSE of the composition according to the present invention.

It is preferred that HECO 2 has a melt flow rate MFR2 (230° C., ISO1133) of 2.5 to 10 g/10 min, preferably 3.0 to 8.5 g/10 min, more preferably 3.5 to 7.5 g/10 min; and a xylene cold soluble fraction (XCS) of 20 to 50 wt.-%, preferably of 21 to 45 wt. %, more preferably 22 to 40 wt.-% (ISO 16152, 1ed, 25° C.); and an intrinsic viscosity (measured in decalin according to DIN ISO 1628/1 at 135° C.) of 4.0 dl/g to 10 dl/g, preferably 5.0 to 9.0 dl/g, more preferably 5.5 to 8.5 dl/g of the xylene cold soluble fraction (XCS); and a melt flow rate MFR2 (230° C., ISO1133) of 20 to 90 g/10 min, preferably 25 to 80 g/10 min, more preferably 30 to 70 g/10 min of the xylene insoluble (XCI) fraction (ISO 16152, 1ed, 25° C.), and a content of units derived from ethylene in the xylene cold soluble fraction (XCS) of 15.0 to 25.0 wt.-%, preferably of 17.0 to 24.0 wt. %, more preferably 19.0 to 23.5 wt.-%, and a total content of units derived from ethylene of 3.0 to 15.0 wt.-%, preferably 3.5 to 13.0 wt.-% and more preferably 4.0 to 11.0 wt.-%.

In a particularly preferred embodiment HECO has a melt flow rate MFR2 (230° C., ISO1133) of 3.5 to 7.5 g/10 min; and a xylene cold soluble fraction (XCS) of 22 to 40 wt.-% (ISO 16152, 1ed, 25° C.); and an intrinsic viscosity (measured in decalin according to DIN ISO 1628/1 at 135° C.) of 5.5 to 8.5 dl/g of the xylene cold soluble fraction (XCS); and a melt flow rate MFR2 (230° C., ISO1133) of 30 to 70 g/10 min of the xylene insoluble (XCI) fraction (ISO 16152, 1ed, 25° C.), and a content of units derived from ethylene in the xylene cold soluble fraction (XCS) of 19.0 to 23.5 wt.-%, and a total content of units derived from ethylene of 4.0 to 11.0 wt.-%.

Ethylene Based Elastomer

The ethylene based elastomer is selected from the group of C2C4 elastomers, C2C6 elastomers and/or C2C8 elastomers, preferably the ethylene based elastomer is a C2C4 elastomer. Such elastomers are also commonly denoted plastomers and are commercially available by Dow Chemical, ExxonMobil and *Borealis*. Independent therefrom, the ethylene based elastomer further has a melt flow rate MFR2

(190° C., ISO1133) of 0.05 to 5.0 g/10 min, preferably 0.1 to 4.5 g/10 min, and a density of 850 to 885 kg/m$^3$, preferably 855 to 875 kg/m$^3$.

In a particularly preferred embodiment, the ethylene based elastomer has a melt flow rate MFR2 (190° C., ISO1133) of 0.1 to 4.5 g/10 min, and a density of 855 to 875 kg/m$^3$. The ethylene based elastomer particularly contributes to the impact properties of the inventive composition and further may act as a compatibilizer of the polypropylene-polyethylene blend (A).

Polypropylene-Polyethylene Blend (A)

The polypropylene-polyethylene blend (A) according to present invention comprises A-1) polypropylene, A-2) polyethylene, wherein the weight ratio of polypropylene to polyethylene is from 19:1 to 7:3.

Simultaneously the polypropylene-polyethylene blend (A) has a melt flow rate MFR2 (230° C., ISO1133) of 5.0 to 30 g/10 min, preferably 7.0 to 26 g/10 min, more preferably 9.0 to 23 g/10 min; and a xylene cold soluble fraction (XCS) of 2.0 to 15 wt.-%, preferably of 2.5 to 13 wt. %, more preferably 3.0 to 11 wt.-% (ISO 16152, 1ed, 25° C.); and optionally a residual ash content of below 3.0 wt.-%, preferably 0.5 to 2.7 wt.-% and more preferably 0.7 to 2.5 wt.-%.

The polypropylene-polyethylene blend (A) according to present invention is a recycled material, preferably originates from household trash. It is particularly preferred that the polypropylene-polyethylene blend (A) according to present invention originates in an amount of at least 90 wt.-% from post-consumer waste.

The polypropylene-polyethylene blend (A) according to present invention may have one or more of the following properties aa) a content of limonene as determined by using solid phase micro-extraction (HS-SPME-GC-MS) of from 0.1 ppm to 100 ppm, preferably from 0.1 ppm to 50 ppm, more preferably from 0.1 ppm to 20 ppm, most preferably from 0.1 ppm to 5 ppm;

bb) a content of fatty acid(s) as determined by using solid phase micro-extraction (HS-SPME-GC-MS) of 0.1 to 100 ppm;

cc) a content of polyamide(s) as determined by NMR of 0.05 to 1.5 wt.-%;

dd) a content of polystyrene(s) as determined by NMR of 0.05 to 3.0 wt.-%;

ee) a residual ash content of mentioned above.

It should be understood that the polypropylene-polyethylene blend (A) may vary broadly in composition, i.e. may include polypropylene homopolymer, polypropylene copolymer, polyethylene, and polyethylene copolymers. As a direct determination of the polypropylene content and polyethylene content is not possible, the weight ratio polypropylene (A-1) to polyethylene (A-2) is 19:1 to 7:3 is the equivalent ratio as determined from calibration by iPP homopolymer and HDPE.

Conventionally the polypropylene-polyethylene blend (A) according to the present invention may also have one or more of the following:

residual content of PET determined as described in the experimental part;

residual talc and chalk content as described in the experimental part;

residual content of metals (determined by x ray fluorescence (XRF)

residual amount of paper as described in the experimental part residual amount of wood as described in the experimental part total free fatty acid content of 0.1 to 100 ppm as measured by using headspace solid phase micro-extraction (HS-SPME-GC-MS).

The polypropylene-polyethylene blend (A) according to the present invention is preferably obtained from washing and/or aeration steps as known in the art.

Additives

Additives are commonly used in the composition according to the present invention. Preferably, the additives are selected from one or more of antioxidant(s), UV stabilizer (s), slip agent(s), nucleating agent(s), pigment(s), lubricant (s), masterbatch polymer(s) and/or anti-fogging agents.

Inorganic Filler

The inorganic filler is preferably talc. The inorganic filler, preferably talc has a median particle size d$_{50}$ before compounding of 0.3 to 3.0 micrometers, more preferably of 0.5 to 2.5 micrometers; and preferably has a top-cut particle size d$_{95}$ before compounding of 1.0 to 8.0 micrometers. Such inorganic fillers are commercially available.

Paint Adhesion

The composition suitable for automotive application preferably shows a paint adhesion assessed as the failed or delaminated coated area.

It is preferred that the composition suitable for automotive application has a failed or delaminated coated area in mm$^2$ of below 24 mm$^2$, preferably from 0 to 24 mm$^2$, more preferably from 0 to 13 mm$^2$.

DETAILED DESCRIPTION

In the following several preferred embodiments shall be described. In a first preferred embodiment, the composition suitable for automotive application according to the present invention is obtainable by blending at least components a) to f), a) 20 to 35 wt.-% of the first heterophasic polypropylene copolymer (HECO 1), and b) 5.0.0 to 20 wt.-% of the second heterophasic polypropylene copolymer (HECO 2), and c) 20 to 30 wt.-% of the polypropylene-polyethylene blend (A), and d) 7.0 to 22 wt.-%, preferably 11.0 to 20 wt.-% of the ethylene based elastomer, and e) 5.0 to 25 wt.-%, preferably 7.0 to 20 wt.-% and more preferably 10 to 19 wt.-% of the inorganic filler, and f) 0.1 to 4.0 wt.-% of additives.

Yet again components a) to e) amount to at least 90 wt.-%, preferably to at least 95 wt.-%, most preferably to at least 96 wt.-% of said composition suitable for automotive application.

All preferred ranges and definitions as described above, particularly all ranges and definitions as described above for blend (A) also hold for this embodiments.

The composition of this embodiment preferably has a tensile modulus (ISO 527.2; 23° C.) of 1400 to 1700 MPa, and a Charpy notched impact strength of at least 40 kJ/m$^2$ (1 eA) (non-instrumented, ISO 179-1 at +23° C.).

Independent therefrom but preferably in addition to that the composition according to this embodiment has a heat deflection temperature (ISO 75 B) of at least 90° C.

This preferred embodiment is characterized by a medium amount of recyclate at good stiffness and very good impact.

In a second preferred embodiment the composition suitable for automotive application according to the present invention is obtainable by blending at least components a) to f), a) 5.0 to 20 wt.-% of the first heterophasic polypropylene copolymer (HECO 1)

b) 2.5 to 7.0 wt.-% of the second heterophasic polypropylene copolymer (HECO 2)

c) 30 to 55 wt.-% of the polypropylene-polyethylene blend (A)

d) 7.0 to 22 wt.-%, preferably 11.0 to 20 wt.-% of the ethylene based elastomer e) 5.0 to 25 wt.-%, preferably 7.0 to 20 wt.-% and more preferably 10 to 19 wt.-% of the inorganic filler; and f) 0.1 to 4.0 wt.-% of additives.

Yet again components a) to e) amount to at least 90 wt.-%, preferably at least 95 wt.-%, most preferably at least 96 wt.-% of said composition suitable for automotive application. The composition according to this embodiment preferably has a tensile modulus (ISO 527.2; 23° C.) of 1200 to 1400 MPa, and a Charpy notched impact strength of at least 40 kJ/m$^2$ (1 eA) (non-instrumented, ISO 179-1 at +23° C.).

All preferred ranges and definitions as described above, particularly all ranges and definitions as described above for blend (A) also hold for this embodiments.

Independent therefrom but preferably in combination, the composition of this embodiment has a melt flow rate (ISO 1133, 2.16 kg, 230° C.) of 6.0 to 15 g/10 min.

This preferred second embodiment is characterized by a very high amount of recyclate at moderate stiffness and still exceptional impact. This embodiment is particular suitable for increasing the amount of filler.

EXPERIMENTAL SECTION

The following Examples are included to demonstrate certain aspects and embodiments of the invention as described in the claims. It should be appreciated by those of skill in the art, however, that the following description is illustrative only and should not be taken in any way as a restriction of the invention.

Test Methods a) Amount of iPP, Polystyrene, Polyethylene (and Ethylene Containing Copolymers), Poly(Ethylene Terephthalate), and Amount of Polyamide-6

To establish different calibration curves different standards, iPP and HDPE and iPP, PS and PA6 were blended. For the quantification of the content of the foreign polymers, IR spectra were recorded in the solid-state using a Bruker Vertex 70 FTIR spectrometer. Films were prepared with a compression-molding device at 190° C. with 4-6 MPa clamping force. The thickness of the films for the calibration standards for iPP and HDPE was 300 μm and for the quantification of the iPP, PS and PA 6 50-100 μm film thickness was used. Standard transmission FTIR spectroscopy is employed using a spectral range of 4000-400 cm-1, an aperture of 6 mm, a spectral resolution of 2 cm-1, 16 background scans, 16 spectrum scans, an interferogram zero filling factor of 32 and Norton Beer strong apodization.

The absorption of the band at 1167 cm-1 in iPP is measured and the iPP content is quantified according to a calibration curve (absorption/thickness in cm versus iPP content in weight %).

The absorption of the band at 1601 cm-1 (PS) and 3300 cm-1 (PA6) are measured and the PS and PA6 content quantified according to the calibration curve (absorption/thickness in cm versus PS and PA content in wt.-%). The content of polyethylene and ethylene containing copolymers is obtained by subtracting (iPP+PS+PA6) from 100, taking into account the content of non-polymeric impurities as determined in the methods below. The analysis is performed as a double determination.

b) Tensile Modulus and Tensile Strain at Break were measured according to ISO 527-2 (cross head speed=1 mm/min; test speed 50 mm/min at 23° C.) using injection molded specimens 1B prepared as described in EN ISO 1873-2 (dog bone shape, 4 mm thickness). The measurement was done after 96 h conditioning time at 23° C. of the specimen.

c) The Impact Strength was determined as Charpy Notched Impact Strength according to ISO 179-1 eA at +23° C., at 0° C., and at −20° C. on injection molded specimens of 80×10×4 mm$^3$ prepared according to EN ISO 1873-2. The measurement was done after 96 h conditioning time at 23° C. of the specimen.

d) Instrumented Puncture Test

Instrumented puncture test was performed on 60×60×1 mm$^3$ injection-molded plaques at 23° C., 0° C. and −20° C. according to ISO6603-2:2000. The measurement was done after 96 h conditioning time at 23° C. of the specimen.

e) Comonomer Content

Poly(Propylene-Co-Ethylene)—Ethylene Content—IR Spectroscopy

Quantitative infrared (IR) spectroscopy was used to quantify the ethylene content of the poly(ethylene-co-propene) copolymers through calibration to a primary method. Calibration was facilitated through the use of a set of in-house non-commercial calibration standards of known ethylene contents determined by quantitative $^{13}$C solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt. % produced at either pilot or full scale under a variety of conditions. The calibration set was selected to reflect the typical variety of copolymers encountered by the final quantitative IR spectroscopy method.

Quantitative IR spectra were recorded in the solid-state using a Bruker Vertex 70 FTIR spectrometer. Spectra were recorded on 25×25 mm square films of 300 μm thickness prepared by compression moulding at 180-210° C. and 4-6 MPa. For samples with very high ethylene contents (>50 mol %) 100 μm thick films were used. Standard transmission FTIR spectroscopy was employed using a spectral range of 5000-500 cm$^{-1}$, an aperture of 6 mm, a spectral resolution of 2 cm$^{-1}$, 16 background scans, 16 spectrum scans, an interferogram zero filling factor of 64 and Blackmann-Harris 3-term apodisation. Quantitative analysis was undertaken using the total area of the CH$_2$ rocking deformations at 730 and 720 cm$^{-1}$ (A$_Q$) corresponding to (CH$_2$)>$_2$ structural units (integration method G, limits 762 and 694 cm$^{-1}$). The quantitative band was normalised to the area of the CH band at 4323 cm$^{-1}$ (A$_R$) corresponding to CH structural units (integration method G, limits 4650, 4007 cm$^{-1}$). The ethylene content in units of weight percent was then predicted from the normalised absorption (A$_Q$/A$_R$) using a quadratic calibration curve. The calibration curve having previously been constructed by ordinary least squares (OLS) regression of the normalised absorptions and primary comonomer contents measured on the calibration set.

Poly(Propylene-Co-Ethylene)—Ethylene Content—$^{13}$C NMR Spectroscopy

Quantitative $^{13}C\{^{1}H\}$ NMR spectra were recorded in the solution-state using a Bruker Avance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., et al. J. Mag. Reson. 187 (2007) 225, and in Busico, V., et al, Macromol. Rapid Commun. 2007, 28, 1128). A total of 6144 (6 k) transients were acquired per spectra. Quantitative $^{13}C\{^{1}H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=E/(P+E) The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to E=0.5(Sββ+Sβγ+Sβδ+0.5(Sαβ+Sαγ)) Through the use of this set of sites the corresponding integral equation becomes E=0.5($I_H$+$I_G$+0.5($I_C$+$I_D$)) using the same notation used in the article of Wang et. al. (Wang, W-J., Zhu, S., Macromolecules 33 (2000), 1157). Equations used for absolute propylene content were not modified. The mole percent comonomer incorporation was calculated from the mole fraction: E [mol %]=100*fE. The weight percent comonomer incorporation was calculated from the mole fraction: E [wt. %]=100*(fE*28.06)/((fE*28.06)+((1−fE)*42.08)).

f) Comonomer Content

Contents were determined using a film thickness method using the intensity of the quantitative band I(q) and the thickness of the pressed film T using the following relationship: [I(q)/T]m+c=C where m and c are the coefficients determined from the calibration curve constructed using the comonomer contents obtained from $^{13}C$-NMR spectroscopy.

Comonomer content was measured in a known manner based on Fourier transform infrared spectroscopy (FTIR)

calibrated with $^{13}C$-NMR, using Nicolet Magna 550 IR spectrometer together with Nicolet Omnic FTIR software. Films having a thickness of about 250 μm were compression molded from the samples. Similar films were made from calibration samples having a known content of the comonomer. The comonomer content was determined from the spectrum from the wave number range of from 1430 to 1100 cm$^{-1}$. The absorbance was measured as the height of the peak by selecting the so-called short or long base line or both. The short base line was drawn in about 1410-1320 cm$^{-1}$ through the minimum points and the long base line about between 1410 and 1220 cm$^{-1}$. Calibrations needed to be done specifically for each base line type. Also, the comonomer content of the unknown sample was within the range of the comonomer contents of the calibration samples.

g) Talc and Chalk Content

TGA according to the following procedure:

Thermogravimetric Analysis (TGA) experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO$_2$) was assigned to CO$_2$ evolving from CaCO$_3$, and therefore the chalk content was evaluated as:

$$\text{Chalk content} = 100/44 \times WCO2$$

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

$$\text{Ash content} = (\text{Ash residue}) - 56/44 \times WCO2 - Wcb$$

Where Ash residue is the weight % measured at 900° C. in the first step conducted under nitrogen. The ash content is estimated to be the same as the talc content for the investigated recyclates.

h) MFR

Melt flow rates were measured with a load of 2.16 kg (MFR$_2$) at 230° C. (polypropylene based materials) or at 190° C. (polyethylene based materials). The melt flow rate is that quantity of polymer in grams which the test apparatus standardized to ISO 1133 extrudes within 10 minutes at a temperature of 230° C. (or 190° C.) under a load of 2.16 kg.

i) Amount of Metals was determined by x ray fluorescence (XRF)

j) Amount of Paper, Wood

Paper and wood were determined by conventional laboratory methods including milling, floatation, microscopy and Thermogravimetric Analysis (TGA).

k) Limonene Measurement

Limonene quantification was carried out using solid phase micro-extraction (HS-SPME-GC-MS) by standard addition.

50 mg ground samples were weighed into 20 mL headspace vials and after the addition of limonene in different concentrations and a glass-coated magnetic stir bar. The vial was closed with a magnetic cap lined with silicone/PTFE. Micro capillaries (10 pL) were used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6 mg/kg, 11 mg/kg and 16.5 mg/kg limonene were used in combination with some of the samples tested in this application. For quantification, ion-93 acquired in SIM mode was used. Enrichment of the volatile fraction was carried out by headspace solid phase micro-extraction with a 2 cm stable flex 50/30 μm DVB/Carboxen/PDMS fibre at 60° C. for 20 minutes. Desorption was carried out directly in the heated injection port of a GCMS system at 270° C.

GCMS Parameters:

Column: 30 m HP 5 MS 0.25*0.25

Injector: Splitless with 0.75 mm SPME Liner, 270° C.

Temperature program: −10° C. (1 min)

Carrier gas: Helium 5.0, 31 cm/s linear velocity, constant flow

MS: Single quadrupole, direct interface, 280° C. interface temperature

Acquisition: SIM scan mode

Scan parameter: 20-300 amu

SIM Parameter: m/Z 93, 100 ms dwell time l) Total free fatty acid content

Fatty acid quantification was carried out using headspace solid phase micro-extraction (HS-SPME-GC-MS) by standard addition.

50 mg ground samples were weighed in 20 mL headspace vial and after the addition of limonene in different concentrations and a glass-coated magnetic stir bar the vial was closed with a magnetic cap lined with silicone/PTFE. 10 μL Micro-capillaries were used to add diluted free fatty acid mix (acetic acid, propionic acid, butyric acid, pentanoic acid, hexanoic acid and octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode was used for all acids except propanoic acid, here ion 74 was used.

GCMS Parameter:

Column: 20 m ZB Wax plus 0.25*0.25

Injector: Split 5:1 with glass lined split liner, 250° C.

Temperature program: 40° C. (1 min) @6° C./min to 120° C., @15° C. to 245° C. (5 min)

Carrier: Helium 5.0, 40 cm/s linear velocity, constant flow

MS: Single quadrupole, direct interface, 220° C. inter face temperature

Acquisition: SIM scan mode

Scan parameter: 46-250 amu 6.6 scans/s

SIM Parameter: m/z 60.74, 6.6 scans/s m) Glass Transition Temperatures

The glass transition temperatures of iPP matrix and elastomer phase were determined by dynamic mechanical thermal analysis according to ISO 6721-7. The measurements were done in torsional deformation mode on compression-molded samples ($40 \times 10 \times 1$ mm$^3$) between −130° C. and +160° C. with a heating rate of 2° C./min and a frequency of 1 Hz using TA Ares G2 test apparatus.

n) VOC Content

VOC content was determined according to VDA278 on compositions as directly obtained from compounding, i.e. merely subjected to storage as set forth in VDA 278.

o) Particle Size Distribution of Filler, Particularly Talc

Median particle size $d_{50}$ and top cut particle size $d_{95}$ are measured by gravitational liquid sedimentation according to ISO 13317-3.

p) The Xylene Solubles (XCS, Wt.-%):

Content of xylene cold solubles (XCS) was determined at 25° C. according ISO 16152; first edition; 2005 Jul. 1. The part which remains insoluble is the xylene cold insoluble (XCI) fraction.

q) Intrinsic Viscosity

Intrinsic viscosity was measured according to DIN ISO 1628/1, October 1999 (in Decalin at 135° C.).

r) Ash Content

Ash content is measured according to ISO 3451-1 (1997) standard.

s) Density

Density was measured according to ISO 1183-187. Sample preparation was done by compression moulding in accordance with ISO 1872-2:2007.

t) Heat DeflectionTemperature (HDT):

The HDT was determined on injection molded test specimens of $80 \times 10 \times 4$ mm$^3$ prepared according to ISO 1873-2 and stored at +23° C. for at least 96 hours prior to measurement. The test was performed on flatwise supported specimens according to ISO 75, condition A, with a nominal surface stress of 1.80 MPa.

u) DSC Analysis, Melting Temperature (Tm) and Heat of Fusion (Hf), Crystallization Temperature (Tc) and Melt Enthalpy (Hm):

All DSC parameters were measured with a TA Instrument Q200 differential scanning calorimetry (DSC) on 5 to 7 mg samples. DSC was run according to ISO 11357/part 3/method C2 in a heat/cool/heat cycle with a scan rate of 10° C./min in the temperature range of −30 to +225° C. The crystallization temperature ($T_c$) was determined from the cooling step, while melting temperature ($T_m$) and melting enthalpy ($H_m$) were determined from the second heating step. The crystallinity was calculated from the melting enthalpy by assuming an Hm-value of 209 J/g for a fully crystalline polypropylene (see Brandrup, J., Immergut, E. H., Eds. Polymer Handbook, 3rd ed. Wiley, New York, 1989; Chapter 3).

v) Paint Adhesion:

Adhesion is characterized as the resistance of decorative coatings such as paints when subjected to high-pressure cleaner washing following certain conditions as described below.

For measuring the paint adhesion of compositions, injection moulded sample plates (150 mm×80 mm×3 mm) were produced at 240° C. melt temperature and 50° C. mold temperature. The flow front velocity was 100 mm/s. Prior coating, the plaques were cleaned with Zeller Gmelin Divinol® mm/s for 5 min. Subsequently, the surface was activated via flaming, where a burner at a speed of 670 mm/s spreads a mixture of propane (9 I/min) and air (180 I/min) in a ratio of 1:20 on the polymer substrate. Afterwards, the polymer substrate was coated with 3 layers, i.e. a primer, base coat (black) and a clear coat. The step of flaming was performed two times.

The decorative coating was incised down to the substrate at a total depth of about 500 μm (including coating and substrate) with a cutting tool making a cross with 100 mm long branches. On each coated substrate, 3 lines with the corresponding cross were incised. The incised area was further exposed to a steam of hot water with temperature T was directed for time t at distance d under angle α to the surface of the test panel. Pressure of the water jet results from the water flow rate and is determined by the type of nozzle installed at the end of the water pipe.

The following parameters were used:

T (water)=68° C.; t=30 s; d=100 mm, α=90°, water pressure of 65 bar, nozzle type=Walter 13/32.

The adhesion was assessed by quantifying the failed or delaminated coated area in mm$^2$ per test line. For each example, 5 panels (150 mm×80 mm×3 mm) have been tested. For this purpose, an image of the test line before and after steam jet exposure was taken. Then the delaminated area was calculated with an image processing software. The average failed area for 3 test lines on 5 test specimens (i.e. in total the average of 15 test points) was reported as average failed area. SD is the standard deviation, which is determined according to the following formula:

$$\text{Sample standard deviation} = \sqrt{\frac{\sum (x - \bar{x})^2}{(n-1)}}$$

wherein:

x are the observed values;

$\bar{x}$ is the mean of the observed values; and n is the number of observations.

Experiments

Catalyst System:

For the polymerization process of HECO 1 and HECO 2 a traditional trans-esterified high yield MgCl$_2$-supported Ziegler-Natta polypropylene catalyst component comprising diethyl phthalate as internal donor was used. Triethyl-aluminium (TEAL) was used as co-catalyst and dicyclo pentyl dimethoxy silane (D-donor) was used as external donor. The catalyst component and its preparation concept are described in general for example in patent publications EP491566, EP591224 and EP586390.

Accordingly, the catalyst component was prepared as follows: first, 0.1 mol of MgCl$_2$×3 EtOH was suspended under inert conditions in 250 ml of decane in a reactor at atmospheric pressure. The solution was cooled to −15° C. and the 300 ml of cold TiCl$_4$ was added while maintaining the temperature at said temperature. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried.

Heco 1 and Heco 2 were made in prepolymerization/loop reactor/gas phase reactor 1/gas phase reactor 2/gas phase reactor 3 configuration followed by a pelletization step. The catalyst system defined above was used in combination with dicyclopentadienyl-dimethoxy silane (donor D) as external donor.

TABLE 1

Preparation of HECO 1 and HECO 2

| | | HECO 1 | HECO 2 |
|---|---|---|---|
| Catalyst | | as described above | |
| Donor | | D | D |
| Prepoly | | | |
| Co/ED | mol/mol | 10 | 6 |
| Co/Ti | mol/mol | 220 | 200 |
| Temperature | ° C. | 30 | 30 |
| Residence time | min | 0.08 | 0.25 |
| Loop | | | |
| Temperature | ° C. | 75 | 85 |
| Split | wt % | 52 | 35 |
| H2/C3 | mol/kmol | 22 | 65.0 |
| MFR | g/10 min | 160 | 140 |
| GPR1 | | | |
| Temperature | ° C. | 80 | 85 |
| Split | wt % | 34 | 40 |
| H2/C3 | mol/kmol | 175 | 21.2 |

TABLE 1-continued

Preparation of HECO 1 and HECO 2

| | | HECO 1 | HECO 2 |
|---|---|---|---|
| MFR | g/10 min | 160 | 55 |
| MFR(GPR1) | g/10 min | 160 | 30 |
| XCS | wt % | 2.0 | 1.9 |
| GPR2 | | | |
| Temperature | ° C. | 80 | 85 |
| C2/C3 | mol/kmol | 550 | 210.0 |
| H2/C2 | mol/kmol | 250 | 15.0 |
| Split | wt % | 14 | 15 |
| C2 | wt % | 8.0 | 4.5 |
| MFR | g/10 min | 100 | 20 |
| GPR3 | | | |
| Temperature | ° C. | — | 85 |
| C2/C3 | mol/kmol | — | 210.0 |
| H2/C2 | mol/kmol | — | 10.0 |
| Split | wt % | — | 10 |
| C2 | wt % | — | 7 |
| MFR | g/10 min | — | 5.5 |
| Pellet | | | |
| XCS | wt % | 15.0 | 22.7 |
| C2(XCS) | wt % | 39.0 | 22.6 |
| iV(XCS) | dl/g | 2.9 | 7.2 |
| MFR | g/10 min | 100 | 5.5 |
| Tm | ° C. | 165 | 166 |
| Tc | ° C. | 118 | 115 |

The heterophasic copolymers HECO1 and HECO2 were compounded in a co-rotating twin-screw extruder Coperion ZSK 47 at 220° C. with 0.15 wt.-% antioxidant (Irganox B215FF from BASF AG, Germany; this is a 1:2-mixture of Pentaerythrityl-tetrakis(3-(3',5'-di-tert. butyl-4-hydroxyphenyl)-propionate, CAS-no. 6683-19-8, and Tris (2,4-di-t-butylphenyl) phosphite, CAS-no. 31570-04-4); 0.05 wt.-% of Ca-stearate (CAS-no. 1592-23-0, commercially available from Faci, Italy).

Table 2 shows the properties of the polypropylene/polyethylene blends (A) as used for the evaluation.

TABLE 2

Properties of Polypropylene/Polyethylene Blends Mixtures (Blend A)

| | Blend A #2 |
|---|---|
| PP/PE ratio | 11:1 |
| Recycling origin | Yes, households |
| limonene | >0.1 ppm |
| MFR2 (230° C., ISO1133), g/10 min | 15.0 |
| Tensile modulus, ISO 527-2, MPa | 1260 |
| XCS (wt.-%) | 9.0 |
| IV (XCS) (dl/g) | 1.0 |
| Charpy NIS +23° C. ISO 179 1 eA, kJ/m$^2$ | 5.0 |
| Charpy NIS −20° C. ISO 179 1 eA, kJ/m$^2$ | 2.0 |

TABLE 3

Comparison of the basic properties of HECO 1 and HECO 2 with Blend (A).

| | | HECO 1 | HECO 2 | Blend (A) |
|---|---|---|---|---|
| MFR | g/10 min | 5.5 | 100 | 15 |
| Tm | ° C. | 166 | 165 | 163 |
| Tc | ° C. | 115 | 118 | 123 |
| XCS | wt % | 22.7 | 15.0 | 9.0 |

TABLE 3-continued

| Comparison of the basic properties of HECO 1 and HECO 2 with Blend (A). | | | | |
|---|---|---|---|---|
| | | HECO 1 | HECO 2 | Blend (A) |
| C2(total) | wt % | 8.0 | 7.0 | 8.5 |
| C2(XCS) | wt % | 22.6 | 39.0 | 29 |
| iV(XCS) | dl/g | 7.2 | 2.9 | 1.0 |
| Tens. Modulus | MPa | 1080 | 1400 | 1260 |
| Charpy NIS 23° C. | kJ/m$^2$ | 48 | 3.2 | 5.0 |
| Charpy NIS −20° C. | kJ/m$^2$ | 6.3 | 1.8 | 2.0 |

It can be seen from Table 3 that a replacement of HECO1 and/or HECO2 by Blend (A) was not foreseeable.

The final compositions were compounded in a Coperin ZSK40 twin-screw extruder at 220° C. using the polymers prepared recycled as described above together with talc Jetfine 3CA (d$_{50}$=1.2 μm; d$_{95}$=3.3 μm), antioxidants, UV-stabilizers, slip agents, nucleating agents, carbon black masterbatch, calcium stearate, antifogging agent.

| | | IE1 | IE2 | IE3 | CE1 | RE2 |
|---|---|---|---|---|---|---|
| HECO 1 | wt % | 24.11 | 31.75 | 11.49 | 49.11 | |
| HECO 2 | wt % | 15.00 | 7.36 | 3.51 | 15.00 | 15.00 |
| C2C4 elastomer | wt % | 17.00 | 17.00 | 17.00 | 17.00 | 17.00 |
| Blend (A) | wt % | 25.00 | 25.00 | 49.11 | | 49.11 |
| Talc | wt % | 15.50 | 15.50 | 15.50 | 15.50 | 15.50 |
| Irgafos 168 | wt % | 0.07 | 0.07 | 0.07 | 0.07 | 0.07 |
| Irganox 1010 | wt % | 0.20 | 0.20 | 0.20 | 0.20 | 0.20 |
| Slip agent (Oleamide) | wt % | 0.20 | 0.20 | 0.20 | 0.20 | 0.20 |
| UV-stabilizer (Chimassorb 119) | wt % | 0.40 | 0.40 | 0.40 | 0.40 | 0.40 |
| Nucleating agent (ADK STAB LA-408XP) | wt % | 0.20 | 0.20 | 0.20 | 0.20 | 0.20 |
| Carbon black masterbatch (CBMB-LD-09) | wt % | 2.00 | 2.00 | 2.00 | 2.00 | 2.00 |
| Lubricant (Ca-stearate) | wt % | 0.20 | 0.20 | 0.20 | 0.20 | 0.20 |
| Antifogging agent (GMS 90) | wt % | 0.12 | 0.12 | 0.12 | 0.12 | 0.12 |
| Density | kg/m$^3$ | 995 | 996 | 1011 | 989 | 1007 |
| MFR 230° C./2.16 kg | g/10 min | 10.5 | 13.8 | 8.3 | 20.9 | 5.6 |
| Ratio blend (A) vs. (Heco1 + Heco2 + C2C4 elastomer) | — | 0.4 | 0.4 | 1.5 | 0.0 | 1.5 |
| Tens. Modulus | MPa | 1465 | 1553 | 1362 | 1712 | 1271 |
| Yield stress | MPa | 18.5 | 18.9 | 18.5 | 19.1 | 18.1 |
| Yield strain | % | 6.7 | 5.8 | 9.0 | 4.0 | 11.1 |
| Stress at break | MPa | 15.8 | 12.7 | 16.3 | 13.6 | 17.0 |
| Strain at break | % | 359 | 63 | 396 | 40 | 385 |
| Charpy NIS 23° C. | kJ/m$^2$ | 50.8 | 43.3 | 44.2 | 26.4 | 54.7 |
| Charpy NIS −20° C. | kJ/m$^2$ | 5.9 | 5.3 | 5.0 | 5.7 | 6.0 |
| IPT 3 mm 23° C. | | | | | | |
| F(max) | N | 2618 | 2641 | 2648 | 2566 | 2616 |
| Energy at F(max) | J | 21.3 | 21.6 | 21.6 | 12.5 | 21.0 |
| Puncture energy | J | 37.4 | 37.6 | 36.5 | 37.5 | 36.9 |
| HDT ISO75 B | ° C. | 92 | 93 | 85 | 94 | 83 |
| CLTE 23/80° C. MD | % | 73.8 | 70.9 | 72.0 | 75.5 | 75.5 |
| CLTE 23/80° C. TD | % | 130.1 | 125.7 | 128.9 | 125.3 | 134.6 |
| Delamination* | mm$^2$ | 2 | 12 | 8 | 25 | 6 |
| Anisotropy | — | 0.57 | 0.56 | 0.56 | 0.60 | 0.56 |
| VOC | μmg/g | below 75 | | | 78 | n.m. |

*Paintability test, average area of delamination

It can be seen that the impact strength, particularly the Charpy impact at 23° C. was surprisingly improved for all inventive examples. Moreover, the low temperature impact also surprisingly stayed on a comparable, for inventive examples IE2 and IE3 on a marginally lower level. These improvements could be obtained at stiffness losses of about 150 to about 350 MPa. Thus, for automotive applications having not too high demands as to stiffness, a surprisingly high replacement of HECO 1 and HECO2 is possible. Inventive examples IE1 and IE2 both including the recyclate "Blend A" in an amount of 25 wt.-% also had a surprisingly high HDT (ISO 75 B) very close to comparative example CE1 not including any recyclate. Reference Example RE2 (not within the scope of the claims) shows that a complete replacement of HECO1 would be thinkable but the stiffness would be too low. Inventive example IE3 shows that the amount of recyclate may be further increased with surprisingly small deteriorations of total melt flow rate and stiffness. All inventive examples also showed similar anisotropy when subjected to warming from 23 to 80° C.

The invention claimed is:

1. A composition suitable for automotive application obtainable by blending at least components a) to f), a) 5.0 to 45 wt.-% of a first heterophasic polypropylene copolymer (HECO 1);

b) 2.0 to 20 wt.-% of a second heterophasic polypropylene copolymer (HECO 2);

c) 10 to 60 wt.-% of a polypropylene-polyethylene blend (A);

d) 2.5 to 25 wt.-% of an ethylene based elastomer;

e) 5.0 to 30 wt.-% of an inorganic filler;

f) 0.1 to 4.0 wt.-% of additives wherein all percentages refer to the total composition, and wherein (i) the first heterophasic polypropylene copolymer (HECO 1) comprises a matrix phase and an elastomer phase dispersed therein, the first heterophasic polypropylene copolymer (HECO 1) having:

a melt flow rate MFR2 (230° C., ISO1133) of 75 to 200 g/10 min; and an intrinsic viscosity (measured in decalin according to DIN ISO 1628/1 at 135° C.) of 1.2 dl/g to 3.2 dl/g of the xylene cold soluble fraction (XCS); and (ii) the second heterophasic polypropylene copolymer (HECO 2) comprises a matrix phase and an elastomer phase dispersed therein, the second heterophasic polypropylene copolymer (HECO 2) having:

a melt flow rate MFR2 (230° C., ISO1133) of 2.5 to 10 g/10 min; and an intrinsic viscosity (measured in decalin according to DIN ISO 1628/1 at 135° C.) of 4.0 dl/g to 10 dl/g of the xylene cold soluble fraction (XCS); and wherein (iii) the polypropylene-polyethylene blend (A) comprises A-1) polypropylene, A-2) polyethylene, wherein the weight ratio of polypropylene to polyethylene is from 19:1 to 7:3, and the polypropylene-polyethylene blend (A) having:

a melt flow rate MFR2 (230° C., ISO1133) of 5.0 to 30 g/10 min; and a xylene cold soluble fraction (XCS) of 2.0 to 15 wt.-% (ISO 16152, 1ed, 25° C.); and wherein the polypropylene-polyethylene blend (A) has one or more of the following properties:

(aa) a content of limonene as determined by using solid phase microextraction (HS-SPME-GC-MS) of from 0.1 ppm to 100 ppm;

(bb) a content of fatty acid(s) as determined by using solid phase microextraction (HS-SPME-GC-MS) of 0.1 to 100 ppm;

and wherein the ethylene based elastomer is selected from the group of C2C4 elastomers, C2C6 elastomers and/or C2C8 elastomers, and wherein the ethylene based elastomer has a melt flow rate MFR2 (190° C., ISO1133) of 0.05 to 5.0 g/10 min, and has a density of 850 to 885 kg/m³; and wherein (iv) the inorganic filler, preferably talc, has a median particle size $d_{50}$ before compounding of 0.3 to 3.0 micrometers, and wherein components a) to e) amount to at least 90 wt.-% of said composition suitable for automotive application.

2. The composition suitable for automotive application according to claim 1 obtainable by blending at least components a) to f), a) 5.0 to 45 wt.-% of the first heterophasic polypropylene copolymer (HECO 1), b) 2.0 to 20 wt.-% of the second heterophasic polypropylene copolymer (HECO 2), c) 10 to 60 wt.-% of the polypropylene-polyethylene blend (A), d) 2.5 to 25 wt.-% of the ethylene based elastomer, e) 5.0 to 30 wt.-% of the inorganic filler, f) 0.1 to 4.0 wt.-% of additives, wherein all percentages refer to the total composition, and wherein (ee) the first heterophasic polypropylene copolymer (HECO 1) comprises a matrix phase and an elastomer phase dispersed therein, the first heterophasic polypropylene copolymer (HECO 1) having:

a melt flow rate MFR2 (230° C., ISO1133) of 75 to 200 g/10 min;

a xylene cold soluble fraction (XCS) of 8.0 to 20.0 wt.-% (ISO 16152, 1ed, 25° C.);

an intrinsic viscosity (measured in decalin according to DIN ISO 1628/1 at 135° C.) of 1.2 dl/g to 3.2 dl/g of the xylene cold soluble fraction (XCS); and a melt flow rate MFR2 (230° C., ISO1133) of 100 to 500 g/10 min of the xylene insoluble (XCI) fraction (ISO 16152, 1ed, 25° C.), a content of units derived from ethylene in the xylene cold soluble fraction (XCS) of 25.0 to 50.0 wt.-% a total content of units derived from ethylene of 2.0 to 13.0 wt.-%, and wherein (ff) the second heterophasic polypropylene copolymer (HECO 2) comprises a matrix phase and an elastomer phase dispersed therein, the second heterophasic polypropylene copolymer (HECO 2) having:

a melt flow rate MFR2 (230° C., ISO1133) of 2.5 to 10 g/10 min;

a xylene cold soluble fraction (XCS) of 20 to 50 wt.-%;

an intrinsic viscosity (measured in decalin according to DIN ISO 1628/1 at 135° C.) of 4.0 dl/g to 10 dl/g of the xylene cold soluble fraction (XCS);

a melt flow rate MFR2 (230° C., ISO1133) of 20 to 90 g/10 min of the xylene insoluble (XCI) fraction (ISO 16152, 1ed, 25° C.), and a content of units derived from ethylene in the xylene cold soluble fraction (XCS) of 15.0 to 25.0 wt.-%, a total content of units derived from ethylene of 3.0 to 15.0 wt.-%, and wherein (gg) the polypropylene-polyethylene blend (A) comprises A-1) polypropylene, A-2) polyethylene, wherein the weight ratio of polypropylene to polyethylene is from 19:1 to 7:3, and the polypropylene-polyethylene blend (A) having a melt flow rate MFR2 (230° C., ISO1133) of 5.0 to 30 g/10 min;

a xylene cold soluble fraction (XCS) of 2.0 to 15 wt.-% (ISO 16152, 1ed, 25° C.); and wherein the polypropylene-polyethylene blend (A) has one or more of the following properties:

(aa) a content of limonene as determined by using solid phase microextraction (HS-SPME-GC-MS) of from 0.1 ppm to 100 ppm;

(bb) a content of fatty acid(s) as determined by using solid phase microextraction (HS-SPME-GC-MS) of 0.1 to 100 ppm;

(cc) a content of polyamide(s) as determined by NMR of 0.05 to 1.5 wt.-%;

(dd) a content of polystyrene(s) as determined by NMR of 0.05 to 3.0 wt.-%; and wherein the ethylene based elastomer is selected from the group of C2C4 elastomers, C2C6 elastomers and/or C2C8 elastomers, the ethylene based elastomer having a melt flow rate MFR2 (190° C., ISO1133) of 0.05 to 5.0 g/10 min, and having a density of 850 to 885 kg/m$^3$; and wherein
(ee) the inorganic filler, has a median particle size $d_{50}$ before compounding of 0.3 to 3.0 micrometers; and wherein components a) to e) amount to at least 90 wt.-% of said composition suitable for automotive application.

3. The composition suitable for automotive application according to claim 1 having tensile modulus (ISO 527.2; 23° C.) of 1300 to 1700 MPa.

4. The composition suitable for automotive application according to claim 1, obtainable by blending at least components a) to f), a) 20 to 35 wt.-% of the first heterophasic polypropylene copolymer (HECO 1);

b) 5.0 to 20 wt.-% of the second heterophasic polypropylene copolymer (HECO 2);

c) 20 to 30 wt.-% of the polypropylene-polyethylene blend (A);

d) 7.0 to 22 wt.-% of the ethylene based elastomer;

e) 5.0 to 25 wt.-% of the inorganic filler;

f) 0.1 to 4.0 wt.-% of additives.

5. The composition suitable for automotive application according to claim 4 having a tensile modulus (ISO 527.2; 23° C.) of 1400 to 1700 MPa, and having a Charpy notched impact strength of at least 40 kJ/m$^2$ (1eA) (non-instrumented, ISO 179-1 at +23° C.).

6. The composition suitable for automotive application according to claim 4 having a heat deflection temperature (ISO 75 B) of at least 90° C.

7. The composition suitable for automotive application according to claim 1 having a melt flow rate (ISO 1133, 2.16 kg, 230° C.) of 10.0 to 25 g/10 min.

8. The composition suitable for automotive application according to claim 1, obtainable by blending at least components a) to f), a) 5.0 to 20 wt.-% of the first heterophasic polypropylene copolymer (HECO 1);

b) 2.5 to 7.0 wt.-% of the second heterophasic polypropylene copolymer (HECO 2);

c) 30 to 55 wt.-% of the polypropylene-polyethylene blend (A);

d) 7.0 to 22 wt.-% of the ethylene based elastomer;

e) 5.0 to 25 wt.-% of the inorganic filler;

f) 0.1 to 4.0 wt.-% of additives.

9. The composition suitable for automotive application according to claim 8 having a tensile modulus (ISO 527.2; 23° C.) of 1200 to 1400 MPa, and having a Charpy notched impact strength of at least 40 KJ/m$^2$ (1eA) (non-instrumented, ISO 179-1 at +23° C.).

10. The composition suitable for automotive application according to claim 8 having a melt flow rate (ISO 1133, 2.16 kg, 230° C.) of 6.0 to 15 g/10 min.

11. The composition suitable for automotive application according to claim 1, wherein the additives are selected from one or more of antioxidant(s), UV stabilizer(s), slip agent(s), nucleating agent(s), pigment(s), lubricant(s), masterbatch polymer(s) and anti-fogging agents.

12. The composition suitable for automotive application according to claim 1 having a VOC as measured on the material as obtained directly from the extrusion following the procedure as described in VDA278 of less than 75 mg per gram of composition.

13. The composition suitable for automotive application according to claim 1 having a paint adhesion assessed as the failed or delaminated coated area in mm$^2$ of below 24 mm$^2$.

14. An article comprising the composition according to claim 1.

15. The composition according to claim 1, wherein the polypropylene-polyethylene based (A) has a residual ash content of below 3.0 wt.-%.

16. The composition according to claim 1, wherein the inorganic filler is talc.

17. The composition according to claim 1, wherein the inorganic filler has a top cut particle size $D_{95}$ before compounding of 1.0 to 8.0 micrometers.

18. The composition according to claim 1, obtainable by blending at least components a) to f), a) 20 to 35 wt.-% of the first heterophasic polypropylene copolymer (HECO 1);

b) 5.0 to 20 wt.-% of the second heterophasic polypropylene copolymer (HECO 2);

c) 20 to 30 wt.-% of the polypropylene-polyethylene blend (A);

d) 11.0 to 20 wt.-% of the ethylene based elastomer;

e) 7.0 to 19 wt.-% of the inorganic filler;

f) 0.1 to 4.0 wt.-% of additives.

19. The composition according to claim 1, obtainable by blending at least components a) to f), a) 5.0 to 20 wt.-% of the first heterophasic polypropylene copolymer (HECO 1);

b) 2.5 to 7.0 wt.-% of the second heterophasic polypropylene copolymer HECO 2);

c) 30 to 55 wt.-% of the polypropylene-polyethylene blend (A);

d) 11.0 to 22 wt.-% of the ethylene based elastomer;

e) 7.0 to 20 wt.-% of the inorganic filler;

f) 0.1 to 4.0 wt.-% of additives.

* * * * *